US008661418B2

(12) United States Patent  
Saji et al.

(10) Patent No.: US 8,661,418 B2  
(45) Date of Patent: Feb. 25, 2014

(54) SETTING PROGRAM, WORKFLOW CREATING METHOD, AND WORK FLOW CREATING APPARATUS

(75) Inventors: Toshimitsu Saji, Kawasaki (JP); Kiyoshi Kouge, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 50 days.

(21) Appl. No.: 13/334,148

(22) Filed: Dec. 22, 2011

(65) Prior Publication Data

US 2012/0180028 A1 Jul. 12, 2012

(30) Foreign Application Priority Data

Jan. 11, 2011 (JP) ................................. 2011-003359

(51) Int. Cl.
*G06F 9/44* (2006.01)
(52) U.S. Cl.
USPC .......................................... 717/132; 717/131
(58) Field of Classification Search
USPC ........................................................ 717/132
See application file for complete search history.

(56) References Cited

U.S. PATENT DOCUMENTS

| 7,478,361 | B2 | 1/2009 | Peteanu et al. | |
| 8,042,091 | B2* | 10/2011 | Koehler et al. | 717/104 |
| 8,046,734 | B2* | 10/2011 | Brown et al. | 717/104 |
| 8,423,879 | B2* | 4/2013 | Bhatt et al. | 714/819 |
| 2002/0032692 | A1* | 3/2002 | Suzuki et al. | 707/200 |
| 2004/0083448 | A1* | 4/2004 | Schulz et al. | 717/101 |
| 2004/0111711 | A1* | 6/2004 | Soroker et al. | 717/136 |
| 2005/0283759 | A1* | 12/2005 | Peteanu et al. | 717/120 |
| 2009/0276274 | A1* | 11/2009 | Sasagawa | 705/8 |
| 2010/0070422 | A1* | 3/2010 | Kikuchi et al. | 705/301 |
| 2010/0313185 | A1* | 12/2010 | Gupta et al. | 717/124 |
| 2011/0010692 | A1* | 1/2011 | Hattori et al. | 717/132 |
| 2012/0180028 | A1* | 7/2012 | Saji et al. | 717/132 |

FOREIGN PATENT DOCUMENTS

| EP | 2 071 453 A1 | 6/2009 | |
| EP | 2071453 A1 * | 6/2009 | G06F 9/445 |
| JP | 10-027203 A | 1/1998 | |
| JP | 10-214289 A | 8/1998 | |
| JP | 2006-277535 A | 10/2006 | |

OTHER PUBLICATIONS

"Extended European Search Report" mailed by EPO and corresponding to European application No. 12150576.2 on Jun. 6, 2012.

* cited by examiner

*Primary Examiner* — Don Wong  
*Assistant Examiner* — Theodore Hebert  
(74) *Attorney, Agent, or Firm* — Fujitsu Patent Center

(57) ABSTRACT

A computer-readable, non-transitory medium storing a program that causes a computer to execute a procedure, the procedure includes acquiring a state from each of a plurality of components of a first server device group before and after execution of an execution control process in which the first server device group is caused to execute processes, the components being hardware or software and whose dependencies are previously defined, and storing, in a storage unit, information in which a component whose state is different before and after the execution of the execution control process is associated with the execution control process.

4 Claims, 14 Drawing Sheets

FIG.5

WORKING TASK TYPE INFORMATION TABLE (TEST ENVIRONMENT)

| TASK NUMBER | TASK TYPE | OPERATION TYPE | OPERATION TARGET | CI NUMBER |
|---|---|---|---|---|
| task001 | REFERENTIAL | — | — | — |
| task002 | OPERATIONAL | STOP | MW1 | 700003 |
| task003 | OPERATIONAL | STOP | MW1 | 700004 |
| task004 | OPERATIONAL | STOP | WEB SERVER | 5001 |
| task005 | OPERATIONAL | STOP | AP SERVER | 5002 |

WORKING TASK TYPE INFORMATION TABLE (REAL ENVIRONMENT)

| TASK NUMBER | TASK TYPE | OPERATION TYPE | OPERATION TARGET | CI NUMBER |
|---|---|---|---|---|
| task001 | REFERENTIAL | — | — | — |
| task002 | OPERATIONAL | STOP | MW3 | 500003 |
| task003 | OPERATIONAL | STOP | MW3 | 500004 |
| task004 | OPERATIONAL | STOP | WEB SERVER | 1001 |
| task005 | OPERATIONAL | STOP | AP SERVER | 1002 |

FIG.6

| TASK NUMBER | PREVIOUS TASK | COLUMN NUMBER | INSERTION PROHIBITION | TASK TYPE | OVERLAPPING TASK |
|---|---|---|---|---|---|
| task101 |  | 1 |  | REFERENTIAL |  |
| task102 | task101 | 2 | PROHIBITED | OPERATIONAL |  |
| task103 | task102 | 3 |  | REFERENTIAL |  |
| task104 | task103 | 4 |  | OPERATIONAL | task003 |
| task105 | task104 | 5 |  | OPERATIONAL |  |
| task106 | task105 | 6 |  | OPERATIONAL | task005 |

FIG.7

[WORKING TASK LIST OF flow003]

| TASK NUMBER | PREVIOUS TASK | COLUMN NUMBER | INSERTION PROHIBITION | TASK TYPE | OVERLAPPING TASK | DEPENDENCY TASK |
|---|---|---|---|---|---|---|
| task101 | | 1 | | REFERENTIAL | | |
| task102 | task101 | 2 | PROHIBITED | OPERATIONAL | | task105 task003 |
| task103 | task102 | 3 | | REFERENTIAL | | |
| task104 | task103 | 4 | | OPERATIONAL | task003 | task005 |
| task105 | task104 | 5 | | OPERATIONAL | | task005 |
| task106 | task105 | 6 | | OPERATIONAL | task005 | |

FIG.8

[WORKING TASK LIST OF flow001]

| TASK NUMBER | PREVIOUS TASK | COLUMN NUMBER | INSERTION PROHIBITION | TASK TYPE | DEPENDENCY TASK |
|---|---|---|---|---|---|
| task001 | | 1 | | REFERENTIAL | |
| task002 | task001 | 2 | PROHIBITED | OPERATIONAL | task003 task004 |
| task003 | task002 | 3 | | OPERATIONAL | task005 |
| task004 | task003 | 4 | | OPERATIONAL | task005 |
| task005 | task004 | 5 | | OPERATIONAL | |

FIG.9

| TASK NUMBER | PREVIOUS TASK | COLUMN NUMBER | INSERTION PROHIBITION | TASK TYPE | DEPENDENCY TASK | |
|---|---|---|---|---|---|---|
| task001 | | 1 | | REFERENTIAL | | |
| task002 | task001 | 2 | PROHIBITED | OPERATIONAL | task003 task004 | |
| task003 | task002 | 3 | | OPERATIONAL | task005 | |
| task004 | task003 | 4 | | OPERATIONAL | task005 | |
| task105 | task104 | 4 | | OPERATIONAL | task005 | ← INSERTED |
| task005 | task004 | 5 | | OPERATIONAL | | |

FIG.10

| TASK NUMBER | PREVIOUS TASK | COLUMN NUMBER | INSERTION PROHIBITION | TASK TYPE | DEPENDENCY TASK | |
|---|---|---|---|---|---|---|
| task001 | | 1 | | REFERENTIAL | | |
| task002 | task001 | 2 | PROHIBITED | OPERATIONAL | task003 task004 | |
| task103 | task102 | 2 | | REFERENTIAL | | ← INSERTED |
| task003 | task002 | 3 | | OPERATIONAL | task005 | |
| task004 | task003 | 4 | | OPERATIONAL | task005 | |
| task105 | task104 | 4 | | OPERATIONAL | task005 | |
| task005 | task004 | 5 | | OPERATIONAL | | |

FIG.11

| TASK NUMBER | PREVIOUS TASK | COLUMN NUMBER | INSERTION PROHIBITION | TASK TYPE | DEPENDENCY TASK | |
|---|---|---|---|---|---|---|
| task001 |  | 1 |  | REFERENTIAL |  | |
| task002 | task001 | 2 | PROHIBITED | OPERATIONAL | task003<br>task004 | |
| task101 |  | 0 |  | REFERENTIAL |  | ← INSERTED |
| task102 | task101 | 1 | PROHIBITED | OPERATIONAL | task105<br>task003 | ← INSERTED |
| task103 | task102 | 2 |  | REFERENTIAL |  | |
| task003 | task002 | 3 |  | OPERATIONAL | task005 | |
| task004 | task003 | 4 |  | OPERATIONAL | task005 | |
| task105 | task104 | 4 |  | OPERATIONAL | task005 | |
| task005 | task004 | 5 |  | OPERATIONAL |  | |

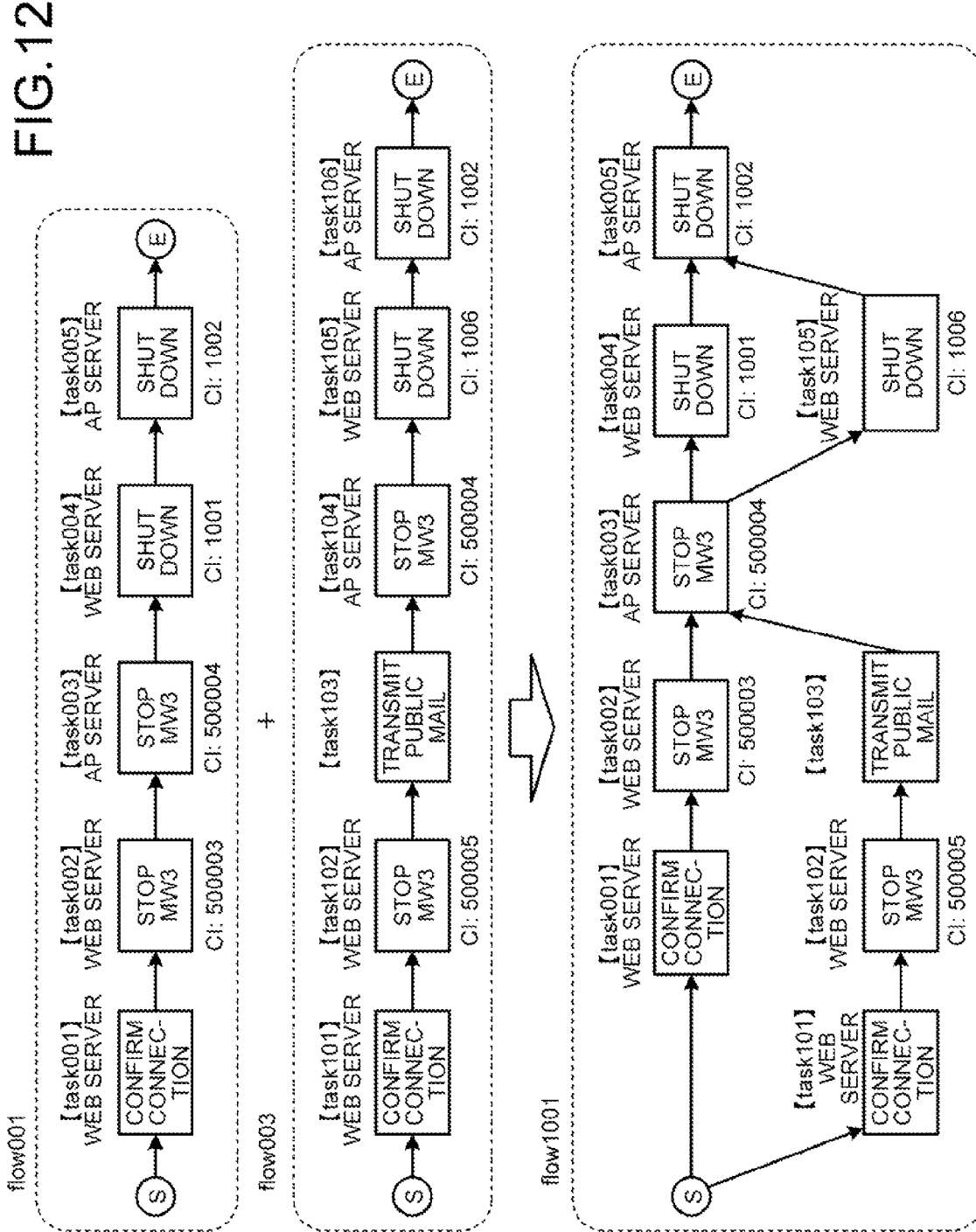

FIG.13

CI TYPE: WORK

31

| CI NUMBER | WORK NAME | ENVIRONMENT TYPE | COMPONENT CI | COMPONENT CI | COMPONENT CI | COMPONENT CI | COMPONENT CI |
|---|---|---|---|---|---|---|---|
| 100001 | SYSTEM 1 | REAL | 1001 | 1002 | 1003 | 1004 | 1005 |
| 100002 | SYSTEM 2 | REAL | 1006 | 1002 | 1003 | 1004 | 1005 |
| 100501 | SYSTEM 1 | TEST | 5001 | 5002 | 5003 | | |

CI TYPE: SERVER

32

| CI NUMBER | SERVER NAME | IP ADDRESS | OS TYPE | OS-VL | COMPONENT CI | COMPONENT CI | COMPONENT CI | DEPENDENT CI | DEPENDENT CI |
|---|---|---|---|---|---|---|---|---|---|
| 1001 | SV-01 | 10.90.111.11 | OS1 | 2003 | 500003 | | | 1002 | |
| 1002 | SV-02 | 10.90.111.12 | OS1 | 2003 | 500004 | | | 1008 | |
| 1003 | SV-03 | 10.90.111.13 | OS1 | 2003 | 500007 | | | | |
| 1004 | SV-04 | 10.90.111.14 | OS1 | 2003 | 500013 | | | | |
| 1005 | SV-05 | 10.90.111.15 | OS2 | 10 | 500009 | | | | |
| 1006 | SV-06 | 10.90.111.16 | OS1 | 2003 | 500005 | | | 1002 | |
| 1007 | SV-07 | 10.90.111.17 | OS1 | 2003 | 500006 | | | | |
| 1008 | SV-08 | 10.90.111.18 | OS2 | 9 | 500017 | | | | |
| 1009 | SV-09 | 10.90.111.19 | OS1 | 2003 | 500018 | | | | |
| 1010 | SV-10 | 10.90.111.20 | OS3 | 4.3 | 500014 | | | | |
| 1011 | SV-11 | 10.90.111.21 | OS1 | 2003 | 500009 | | | | |
| 1012 | SV-12 | 10.90.111.22 | OS4 | 5 | 500010 | | | | |
| 5001 | SV-11 | 10.90.111.21 | OS1 | 2003 | 500011 | | | 5002 | |
| 5002 | SV-11 | 10.90.111.21 | OS1 | 2003 | 500012 | | | 5003 | |
| 5003 | SV-11 | 10.90.111.21 | OS1 | 2003 | 500019 | | | | |

FIG.14

CI TYPE: MIDDLEWARE (MW)  33

| CI NUMBER | MW NAME | VENDER NAME | MW-VL | DEPENDENT CI | DEPENDENT CI | ... |
|---|---|---|---|---|---|---|
| 500001 | MW3 | F COMPANY | 8 | | | |
| 500002 | MW3 | F COMPANY | 7 | | | |
| 500003 | MW3 | F COMPANY | 8 | 1001 | 500004 | |
| 500004 | MW3 | F COMPANY | 7 | 1002 | | |
| 500005 | MW3 | F COMPANY | 8 | | | |
| 500006 | MW3 | F COMPANY | 7 | 1002 | | |
| 500007 | MW1 | | 5 | 1006 | | |
| 500008 | MW1 | | 6 | | | |
| 500009 | MW1 | | 5 | | | |
| 500010 | MW1 | | 6 | | | |
| 500011 | MW1 | | 5 | | | |
| 500012 | MW1 | | 6 | | | |
| 500013 | MW1 | | 6 | | | |
| 500014 | MW4 | I COMPANY | 7 | | | |
| 500015 | MW4 | I COMPANY | 8 | | | |
| 500016 | MW5 | H COMPANY | 4 | | | |
| 500017 | MW6 | O COMPANY | 12 | | | |
| 500018 | MW6 | O COMPANY | 12 | | | |
| 500019 | MW2 | F COMPANY | 10 | | | |
| 500020 | MW7 | F COMPANY | 13 | | | |
| 500021 | MW7 | F COMPANY | 13 | | | |
| 500022 | MW8 | I COMPANY | | | | |
| 500023 | MW9 | H COMPANY | | | | |
| 700003 | MW1 | | 5 | 5001 | 700004 | |
| 700004 | MW1 | | 5 | 5002 | | |

FIG.15

WORKFLOW DEFINITION INFORMATION TABLE 21

| FLOW NUMBER | FLOW NAME | COMPONENT TASK | COMPONENT TASK | COMPONENT TASK | COMPONENT TASK | COMPONENT TASK | ... |
|---|---|---|---|---|---|---|---|
| flow001 | MAINTENANCE WORKING PREPARATION | task001 | task002 | task003 | task004 | task005 | |
| flow002 | ..... | task051 | task052 | task053 | | task105 | |
| flow003 | ..... | task101 | task102 | task103 | task104 | | |
| flow004 | ..... | task031 | task032 | task033 | task034 | | |
| flow005 | ..... | task121 | task122 | task123 | task124 | task125 | |
| flow006 | ..... | task141 | task142 | | | | |
| flow007 | ..... | task151 | task152 | task153 | task154 | | |
| flow008 | ..... | task161 | task162 | task163 | task164 | task165 | |
| flow009 | ..... | task171 | task172 | | | | |
| flow010 | ..... | task181 | task182 | task183 | | | |
| flow011 | ..... | task191 | task192 | task193 | task194 | | |
| flow012 | ..... | task201 | task202 | task203 | task204 | task205 | |

WORKING TASK TYPE INFORMATION TABLE 22

| TASK NUMBER | PREVIOUS TASK | COLUMN NUMBER | INSERTION PROHIBITION | TASK TYPE | OPERATION TYPE | OPERATION TARGET | CI NUMBER |
|---|---|---|---|---|---|---|---|
| task001 | | 1 | | REFERENTIAL | — | — | — |
| task002 | task001 | 2 | PROHIBITED | OPERATIONAL | STOP | MW3 | 500003 |
| task003 | task002 | 3 | | OPERATIONAL | STOP | MW3 | 500004 |
| task004 | task003 | 4 | | OPERATIONAL | STOP | WEB SERVER | 1001 |
| task005 | task004 | 5 | | OPERATIONAL | STOP | AP SERVER | 1002 |
| OMITTED | | | | | | | |
| task101 | | 1 | | REFERENTIAL | — | — | — |
| task102 | task101 | 2 | PROHIBITED | OPERATIONAL | STOP | MW3 | 500005 |
| task103 | task102 | 3 | | REFERENTIAL | STOP | MW3 | 500004 |
| task104 | task103 | 4 | | OPERATIONAL | STOP | WEB SERVER | 1006 |
| task105 | task104 | 5 | | OPERATIONAL | STOP | AP SERVER | 1002 |
| task106 | task105 | 6 | | OPERATIONAL | | | |
| OMITTED | | | | | | | |

SETTING PROGRAM, WORKFLOW CREATING METHOD, AND WORK FLOW CREATING APPARATUS

CROSS-REFERENCE TO RELATED APPLICATION

This application is based upon and claims the benefit of priority of the prior Japanese Patent Application No. 2011-003359, filed on Jan. 11, 2011, the entire contents of which are incorporated herein by reference.

FIELD

The embodiment discussed herein is related to a setting program, a workflow creating method, and a workflow creating apparatus.

BACKGROUND

In a conventional method, a series of tasks that an information processing apparatus is caused to execute is executed automatically as a workflow. The workflow is a series of work procedures defined by combining tasks each of which is an operation of an OS or middleware (application). For example, a series of tasks that are defined as a workflow for monitoring or maintenance work are automatically executed at a data center in which a large number of IT devices (servers, storage devices, networks, etc.) are installed and in which a plurality of work systems each configured with an operating system (OS), middleware, and an application is run.

General run book automation (RBA) products that automate operational work in data centers provides a script execution environment that does not depend on the OS and also provides a means for creating work tasks corresponding to work by using the functions provided by the OS, such as file operations, irrespective of the type of the OS and for automating the work tasks.

It is known that, with the exception of an OS, for example, for the execution of operations on middleware, a workflow is created by combining work tasks for the execution of operations on each middleware product. In this case, by creating a script that absorbs the different in operations between middleware, the operations may be made logical and accordingly the middleware may be caused to run in a different environment by using the same workflow.

Examples of such techniques are disclosed in Japanese Laid-open Patent Publication No. 2006-277535, Japanese Laid-open Patent Publication No. 10-27203, and Japanese Laid-open Patent Publication No. 10-214289.

However, for example, when a workflow (definition of the operational work procedures) that has been tested under a test environment is loaded in an actual real environment where real works are carried out, the system configuration or the roles of the server may be different in the test environment and the real environment. For example, even the same application server may have a role of executing a single work or a plurality of works.

For this reason, it is preferable to change the operational work procedure in consideration of the procedure for starting the server or the procedure for stopping the server in accordance with the dependencies between servers. For example, when the application (middleware) or the server is stopped for maintenance work, such as application of a patch, the effected area is different depending on the role of the server and thus the work tasks before and after the stopping of the server may be different. In order to accurately deal with the change, the workflow needs to be corrected manually.

In the conventional technology, the staff who manage workflows manually clarify the difference in the configuration (difference in the system configuration) between the test environment and the real environment and manually perform correction work on workflow definitions according to the real environment in which the workflow is installed.

Manually changing the definition may cause quality deterioration. Thus, by preparing an environment closer to the actual real environment as a test environment in a range that the cost allows, the range for manual correction may be reduced. However, bringing the test environment closer to the real environment causes an increase in IT costs.

SUMMARY

According to an aspect of an embodiment, a computer-readable, non-transitory medium storing a program that causes a computer to execute a procedure, the procedure includes acquiring a state from each of a plurality of components of a first server device group before and after execution of an execution control process in which the first server device group is caused to execute processes, the components being hardware or software and whose dependencies are previously defined, storing, in a storage unit, information in which a component whose state is different before and after the execution of the execution control process is associated with the execution control process, identifying, from a plurality of components of a second server device group, a component whose dependency with another component of the second server device group is previously defined, the dependency of the identified component being the same as a dependency between a component which is stored in the storage unit in association with the execution control process and another component of the first server device group, and performing a setting process in which the identified component is caused to execute the execution control process.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 5 is an illustrative diagram of a specific example of the loading of a workflow;

FIG. 6 is an illustrative diagram of a specific example of a work task table created for flow 003;

FIG. 7 is a first illustrative diagram of change in the work task table;

FIG. 8 is a second illustrative diagram of change in the work task table;

FIG. 9 is a third illustrative diagram of change in the work task table;

FIG. 10 is a fourth illustrative diagram of change in the work task table;

FIG. 11 is a fifth illustrative diagram of change in the work task table;

FIG. 12 is a schematic diagram illustrating the combining of workflows;

FIG. 13 is a first illustrative diagram of a specific example of a CMDB 30;

FIG. 14 is a second illustrative diagram of the specific example of the CMDB 30;

FIG. 15 is an illustrative diagram of a specific example of a workflow DB 20;

DESCRIPTION OF EMBODIMENT(S)

Preferred embodiments will be explained with reference to accompanying drawings.

Figure 1:
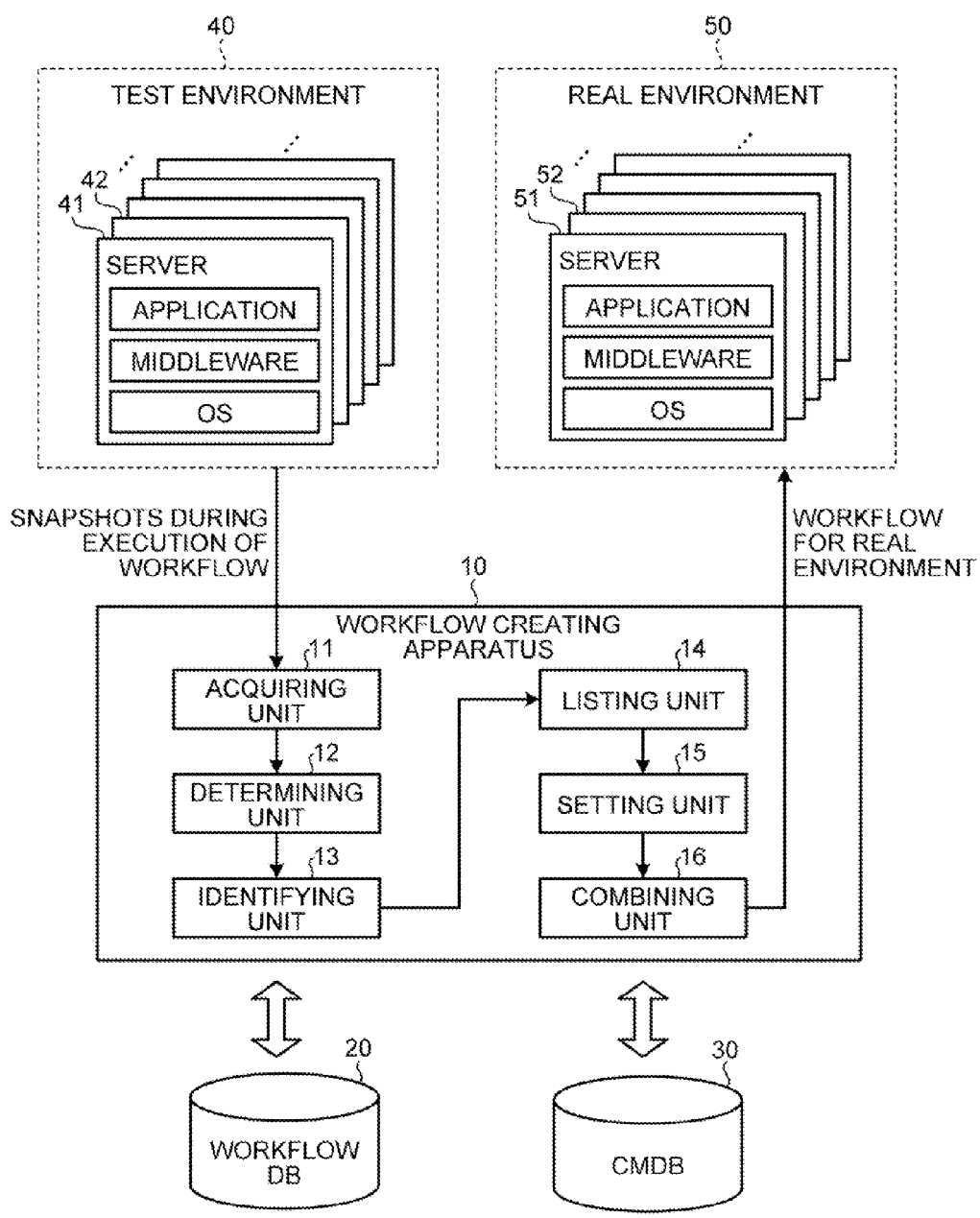
FIG. 1 is a diagram of a configuration of a workflow creating apparatus 10 according to an embodiment.

FIG. 1 is a diagram of a configuration of a workflow creating apparatus 10 according to an embodiment. The workflow creating apparatus 10 includes an acquiring unit 11, a determining unit 12, an identifying unit 13, a listing unit 14, a setting unit 15, and a combining unit 16.

The acquiring unit 11 acquires the state of components in a test environment 40 before and after the execution of a task that is contained in a workflow that is executed under the test environment 40. According to the result of the acquisition by the acquiring unit 11, if the state before and after the execution of the task is changed, the determining unit 12 determines that the task is an operational task. If there is no change in the state, the determining unit 12 determines that the task is a referential task.

On the basis of the change in the state, the identifying unit 13 identifies on which component in the test environment the operational task is executed. The listing unit 14 extracts a workflow that contains the component on which the operational task is executed and lists the tasks before and after the operational task.

The setting unit 15 sets whether a task in the workflow may be inserted between a task in the workflow and a task that was previously executed in the workflow (previous task). The combining unit 16 generates a workflow on the basis of, as for an operational task, the configuration information indicating the configuration of a real environment 50, the previous and next tasks that are listed by the listing unit 14, and the component on which the operation is performed, which is the component specified according to the dependency that is defined between components. Accordingly, the combining unit 16 may create a workflow that does not have any effect on other components during the execution of the task under the real environment.

The test environment 40 is a system configured with a group of servers including servers 41 and 42. In each server, middleware and an application run on an OS. The real environment 50 is a system configured with a group of servers including servers 51 and 52. In each server, middleware and an application run on an OS.

The test environment 40 is a system for testing operations under the real environment 50 and the configuration of the test environment 40 is not the same as that of the real environment. The system configurations of the test environment 40 and the real environment 50 are registered in a configuration management database (CMDB) 30. The CMDB 30 automatically draws the dependence between the configuration items (hereinafter, "CI"), such as applications, that run between servers or on a server and manages the dependency. The workflow DB 20 is a database used by the workflow creating apparatus 10 and in which the created workflow is registered.

Figure 2:
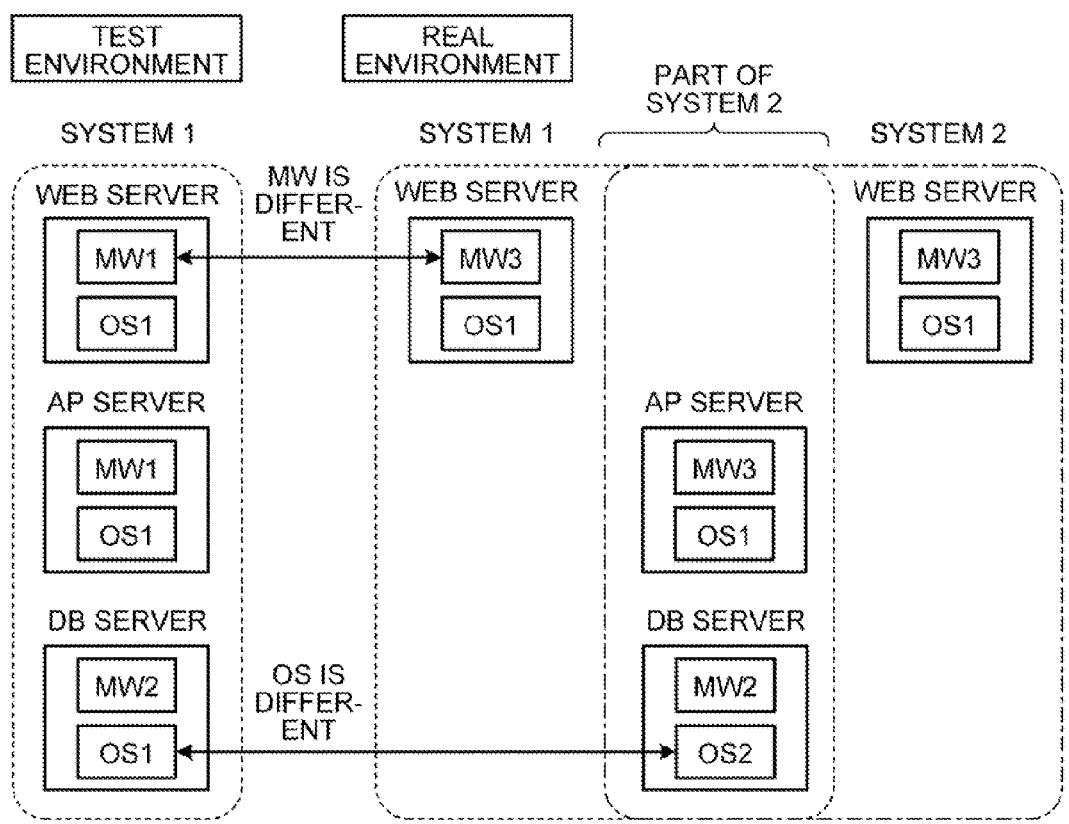
FIG. 2 is an illustrative diagram of a specific example of a test environment 40 and a real environment 50.

FIG. 2 is an illustrative diagram of a specific example of the test environment 40 and the real environment 50. A system 1 that is constructed in the test environment 40 includes a Web server, an AP server, and a DB server. Under the test environment 40, in the Web server of the system 1, middleware MW1 runs on an OS1. Similarly, in the AP server of the system 1 under the test environment 40, the middleware MW1 runs on the OS1. In the DB server of the system 1 under the test environment 40, middleware MW2 runs on the OS1.

As in the case of the test environment 40, the system 1 constructed in the test environment 50 includes a Web server, an AP server, and a DB server. Under the test environment 50, in the Web server of the system 1, middleware MW3 runs on the OS1. Similarly, in the AP server of the system 1 under the real environment 50, the middle ware MW3 runs on the OS1. In the DB server of the system 1 under the test environment 50, the middleware MW2 runs on an OS2.

As describe above, a comparison of the test environment 40 and the test environment 50 indicates there are differences in the middleware of the Web server of the system 1 and in the OS of the DB server of the system 1. In addition, under the real environment 50, the AP server and the DB server are shared by a system 2 and the system 1. The Web server of the system 2 includes a server independent of the system 1.

Figure 3:
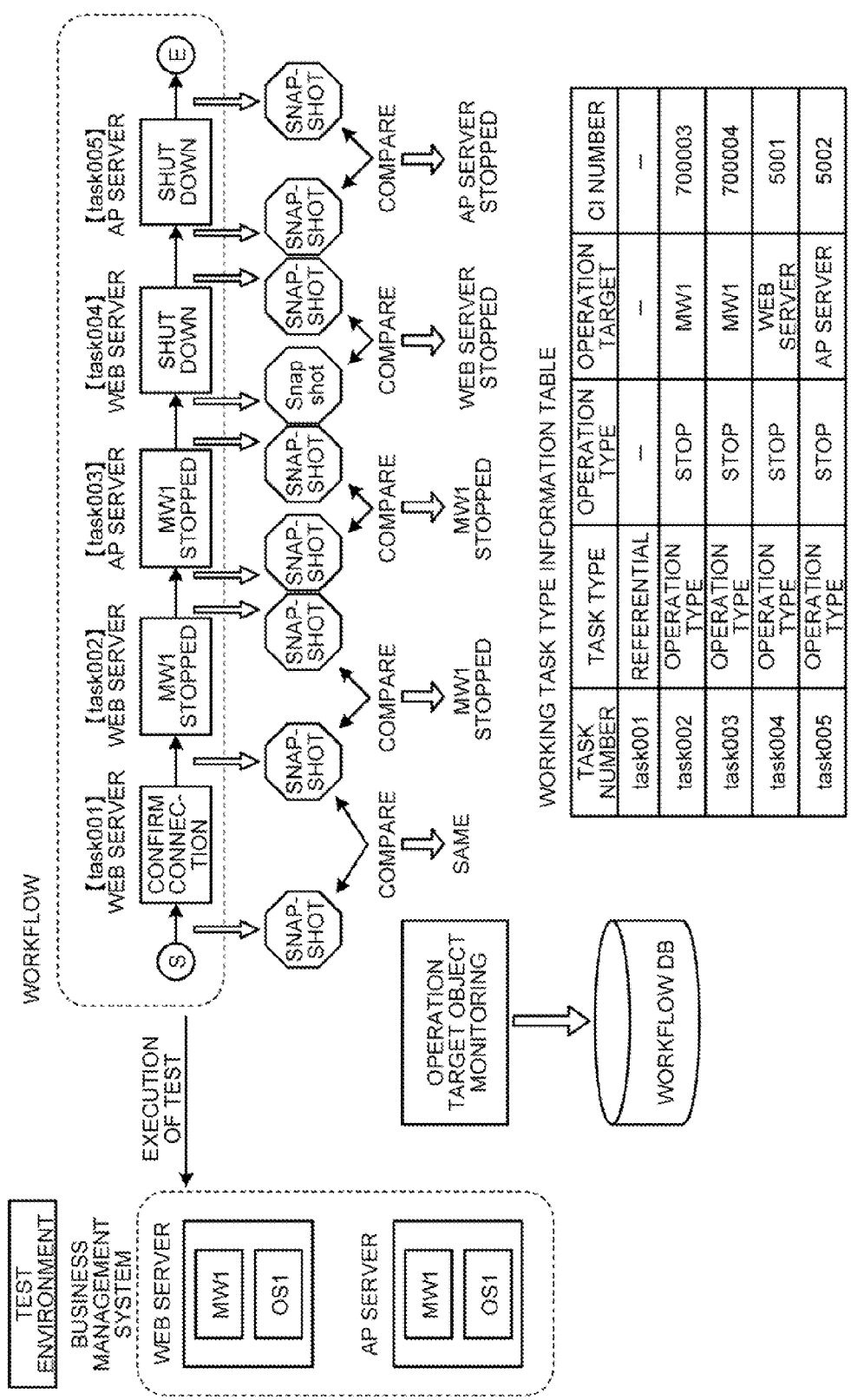
FIG. 3 is an illustrative diagram illustrating a process under the test environment 40.

FIG. 3 is an illustrative diagram illustrating a process under the test environment 40. The acquiring unit 11 is an operation target object monitor that monitors the state of an operation target object for each task of the workflow, which is executed under the test environment 40, is performed. The acquiring unit 11 acquires, as snapshots, the state of the OS, the state of the middleware, and the state of the process before and after execution of a work task.

The acquiring unit 11 acquires the state of the server (state of the OS) by performing a ping via an external management server. Regarding the state of the middleware, the acquiring unit 11 acquires the state of the service by using the function of the OS. An example of an OS function is a net start command. The acquiring unit 11 acquires a process list by using the OS function.

The determining unit 12 compares the snapshot before the work task and the snapshot after the work task. When there is no difference, the determining unit 12 determines that the task is a "referential task". When there is a difference, the determining unit 12 determines that the task is an "operational task" and saves the type of the work task in the workflow DB 20.

When the determining unit 12 determines that the task is an "operational task", the identifying unit 13 searches CIs in the CMDB 30 by using, as a key, the information that is expressed as the difference by a snapshot comparison and saves, as operational task information, the relationship representing on which CI the operational task has an effect in the workflow DB 20.

When the information that is expressed as the difference by the snapshot comparison represents "a change of the state of the server", the CIs in the CMDB 30 are searched by using the IP address as a key and the relationship representing on which CI the operational task has an effect is saved as work task information in the workflow DB 20. For example, when the result of the ping response is different before and after the execution of the task, it is determined that the state of the server has changed.

When the information that is expressed as the difference by the snapshot comparison is a "a change of the state of the process", as in the above-described case of the sever, the CIs in the CMDB 30 are searched and the relationship representing on which CI the operational task has an effect is saved as work task information in the workflow DB 20. For example, when the process list acquired by using the function of the OS is different before and after the execution of the task, it is determined that the state of the process has changed.

When the information that is expressed as the difference by the snapshot comparison is neither on a "server state change" nor on a "process state change", it is specified which middleware running on the OS is of the service whose state has changed and, by using the specified information, the CIs in the CMDB 30 are searched and the relationship representing on which CI the operational task has an effect is saved as work task information in the workflow DB 20. For example, when the response to the net start command is different before and after the execution of the task, it is determined that the state of the service has changed.

In the method of specifying which middleware running on the OS is of the service whose state has changed, specifically, information that coincides with the "service name" is searched in the range of the information on uninstallation in the registry in which the OS manages the product information and information that coincides with an area registered as the product name is extracted. When only one type of information is extracted, the information is specified as the middleware on which the operation is performed.

When information is not uniquely specified, i.e., when information that coincides with the service name is not found or a plurality of types of information is found, an execution pass of the service is extracted from the information that manages the service. By using the pass information as a key, the range of information on software in the registry is searched. According to the result of the search, if there is only one coinciding pass name, the product name corresponding to the software information having the information is specified as the middleware on which the operation is performed. If the middleware is not specified even by this search, it is satisfactory if a plurality of product name candidates found by the search is proposed in combination with the "service names" to the manager, for example, displayed on the screen and the manager performs selection and specifying.

In the example illustrated in FIG. 3, there is no change before and after the execution of a work task task0001. Thus, task0001 is a referential task. After a work task0002, middleware MW1 stops; therefore the work task task002 is an operational task. As for the work task 002, the operation type represents a stop, the operation target represents the middleware MW1, and the CI number is 700003.

Figure 4:
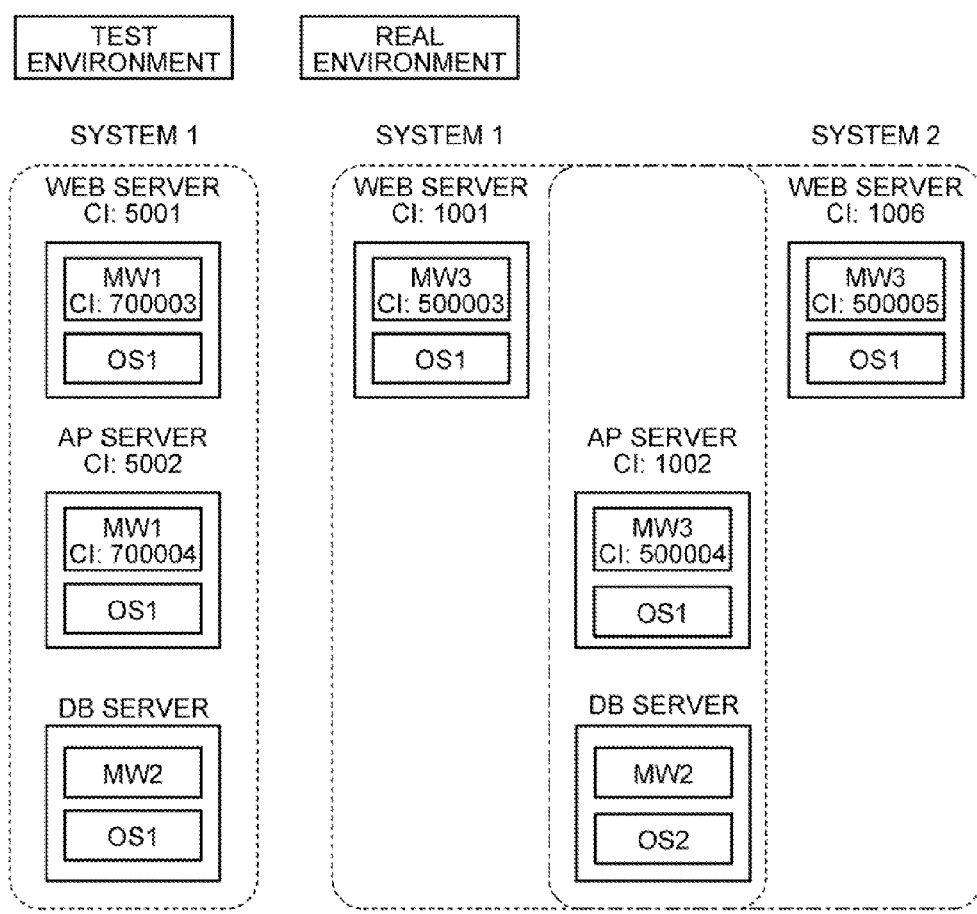
FIG. 4 is an illustrative diagram of the environment in FIG. 2 with the addition of CI numbers.

FIG. 4 is an illustrative diagram in which the environment in FIG. 2 is denoted by CI numbers. As illustrated in FIG. 4, the CI number of the Web server of the system 1 of the test environment is 5001 and the CI number of the middleware MW1 running in the Web server of the system 1 of the test environment is 700003. The CI number of the AP server of the system 1 of the test environment is 5002 and the CI number of the middleware MW1 running in the AP server of the system 1 of the test environment is 700003.

Similarly, the CI number of the Web server of the system 1 of the real environment is 1001 and the CI number of the middleware MW3 running in the Web server of the system 1 of the real environment is 500003. The CI number of the AP server of the system 1 of the real environment is 1002 and the CI number of the middleware MW3 running in the AP server of the system 1 of the real environment is 500004. In addition, the CI number of the Web server of the system 2 of the real environment is 1006 and the CI number of the middleware MW3 running in the Web server of the system 2 of the real environment is 500005.

These CI numbers are obtained from the specific example of the CMDB 30 in FIGS. 13 and 14. A table 31 in FIG. 13 is of configuration information on work that is contained in the CMDB 30. The system 1 of the real environment is denoted by a CI number 100001, the system 2 of the real environment is denoted by a CI number 100002, and the system 1 of the test environment is denoted by a CI number 1000501. The table 31 also represents that the system 1 (CI number: 100001) of the real environment includes 1001 to 1005 as component CIs. The table 31 similarly represents that the system 2 (CI number: 100002) of the real environment includes 1006 and 1002 to 1005 as component CIs. The table 31 also represents that the system 1 (CI number: 100501) of the test environment includes 5001 to 5003 as component CIs.

A table 32 in FIG. 13 represents configuration information on servers contained in the CMDB 30. The table 32 represents, regarding the CI numbers 1001 to 1012 and 5001 to 5003, server names, IP addresses, OS types, OS-VLs (version level), component CIs, and dependency CIs.

A table 33 in FIG. 14 represents configuration information on middleware contained in the CMDB 30. The table 33 represents, regarding the CI numbers 500001 to 500023 and 700003 to 700004, middleware names, vender names, MW-VLs (version level), and dependency CIs.

A specific example of the workflow DB 20 will be described with reference to FIG. 15. A table 21 in FIG. 15 is a table representing the definition of the workflow. The table 21 represents workflow numbers (flow001 to 012), flow names, and component tasks that are the work tasks that constitute the flow.

A table 22 in FIG. 15 is a table representing information on work tasks. The table 22 includes task numbers identifying the operation tasks, previous tasks, column numbers, whether to prohibit insertion of another task between a task and the previous task, operation types, operation targets, and CI numbers of operation targets.

As described above, the workflow creating apparatus 10 acquires snapshots before and after each work task of the workflow executed under the test environment 40 and determines whether each work task is an operational task. When the work task is an operational task, the workflow creating apparatus 10 may obtain, by referring to the CMDB 30, a table representing to which CI the operation type and the operation target correspond.

The workflow creating apparatus 10 then loads the workflow into the real environment 50. When the workflow is loaded into the real environment 50, the listing unit 14 lists, on the basis of the information saved in the workflow DB 20 by the identifying unit 13, the operation targets for each work task (represented as CIs in the CMDB 30) in the workflow in the case when the listing unit 14 applies the workflow to the real environment 50. The following processes (1) to (4) are repeated for each operation target.

(1) A workflow containing a work task (operational task) in which the operation is performed on the operation target is extracted. A workflow containing only referential tasks is not extracted.

(2) The work task for the operation target and the previous and next work tasks are extracted from the extracted workflow and a list of candidates for work tasks to be combined is created.

(3) The operation target and the dependency of the configuration item (CI) of the operation target in the work task list are acquired from the CMDB 30 and then the dependency between work tasks is drawn in combination with the dependency between operation targets (CIs).

(4) According to the drawn dependency between work tasks, the work tasks are recombined and workflows are combined and a new workflow originating from the original workflows is generated.

FIG. 5 is an illustrative diagram of a specific example of the installation of a workflow. By searching the CMDB 30, the CI numbers of the Web server and the AP server under the real environment 50 corresponding to the CI number "5001" and "5002" are determined. For example, if the CMDB 30 contains the table 31 and the table 32 in FIG. 13, the component CIs 1001, 1002, 1003, 1004, and 1005 included in the system 1 are read from the table 31 and the CI numbers of the component CIs whose dependency between the component CIs is the same as that between the component CIs 5001 and 5002 are acquired. Accordingly, it is determined that the CI numbers of the Web server and the AP server under the real environment corresponding to the CI numbers "5001" and "5002" are "1001" and "1002". Furthermore, the CI numbers under the real environment 100001 having the same relationship as that of "700003" dependent on the CI number "5001" and "70004" dependent on the CI number "5002" are extracted.

As a result, the CI number "5001" under the test environment 40 is replaced by the corresponding CI number "1001" under the real environment 50 and the CI number "5002" under the test environment 40 is replaced by the corresponding CI number "1002" under the real environment 50. Similarly, the CI number "700003" under the test environment is replaced by the corresponding CI number "500003" under the real environment 50 and the CI number "700004" under the test environment 40 is replaced by the corresponding CI number "500004" under the real environment 50.

From the operation tasks, a workflow that contains work tasks (operational tasks) in which operations are performed on operation targets is extracted (i.e., no workflow containing only referential tasks is extracted). Specifically, corresponding operational tasks are extracted from the table 22 and then a workflow containing the operational tasks is extracted from the table 21.

In the example of FIG. 5, all workflow definitions are searched for operational tasks in which a "stop" operation is performed on the CI numbers "500003", "500004", "1001", and "1002" and a corresponding workflow is extracted. As a result, it may be seen that the stop operation is performed on the CI numbers "50004" and "1002" in another workflow (flow0003).

According to the extracted workflow, the work tasks for the operation targets and the previous and next work tasks are extracted from the table 21 and a list of candidates for work tasks to be combined is created. Work tasks whose operation targets overlap with those of Flow001 are recorded as overlapping tasks.

FIG. 6 is an illustrative diagram of a specific example of a table created for Flow 003. Regarding the tasks task101 to task106, previous tasks, column numbers, whether to prohibit insertion of another task between a task and the previous task, task types, and overlapping tasks are represented. Insertion of another task between the task task102 and the previous task task101 is prohibited. The prohibition of the setting process depends on the contents of the task and is done by the setting unit 15. The setting unit 15 may determine the contents of tasks and then automatically perform the setting process, or the setting unit 15 may accept an operation from the operating staff and then perform the setting process. For a task task104, a task task003 is set as an overlapping task. For a task task106, a task005 is set as an overlapping task.

The combining unit 16 of the workflow creating apparatus 10 acquires the dependencies between CIs that are the listed operation targets for the operational tasks from the CMDB 30 and draws the dependencies between the work tasks in accordance with the dependencies between the operation targets (CIs).

In the CMDB 30, the CI number "1006" depends on "1002" and "500005" that is the component CI of "1006" depends on "1006". Accordingly, it may be understood that the operation tasks for operating each CI have similar dependencies. By clarifying the dependencies between all work tasks of flow 003 in this manner, the list in FIG. 7 is obtained. These operation tasks are executed in this order. Tasks having no dependency may be executed in parallel.

The dependencies of the workflow "flow001" that is to be similarly loaded, the list in FIG. 8 is obtained by clarifying, in the same manner as illustrated in FIG. 6. Specifically, regarding the tasks task001 to task0005 contained in flow 001, previous tasks, column numbers, whether to prohibit insertion, task types, and dependency tasks are set. It is represented that, regarding the task task0002, prohibition is set and dependency tasks are task0003 and task0004 and, regarding task003 and task004, the dependency task is task005.

On the basis of the drawn dependencies between the work tasks, the combining unit 16 recombines the tasks and combines workflows and creates a new workflow derived from the original workflows.

In the specific example, flow001 is the main flow and flow0003 is another flow. In the task list of the other flow, the tasks are performed in an inverse loop starting from the largest list number.

If a task number is stored as an "overlapping task" in a process row of the other flow, no process is performed and the process shifts to the next row.

When there is a task number in "dependency task" in a process row of the other flow, the process row is copied just before the row of the task number in the main flow (flow001). The process row is copied excluding the overlapping task column. A value obtained by subtracting "1" from the column number of the dependency task is set for the "column number" of the row to which the row is be inserted. After this process is performed, the process shifts to the next row.

As a result, the task list of flow001 changes as represented in FIG. 9. In FIG. 9, task105 is inserted between task0005 and task0004 and the column number of task105 is 4.

When there is no task number in "dependency task" of a process row of the other flow, the process row is copied (excluding the overlapping task column) just before the task row in the main flow (flow001) corresponding to the next row of the copied row in the other flow. A value obtained by subtracting "1" from the column number of the next row of the row to which the row is inserted is set for the "column number" of the row to be inserted. After this process is performed, the process is shifted to the next row.

As a result, the task list of flow 0001 changes as represented in FIG. 10. In FIG. 10, task 103 is inserted between task 003 and task 002 and the column number for task 103 is 2.

Furthermore, when "prohibited" is displayed in the "insertion prohibition" column of the process row of the other flow, a plurality of rows including the previous row is copied to the main flow according to the above-described rules. For the insertion, a value obtained by subtracting "1" from the column number of the work to which the row is inserted is set. Note that, if "insertion prohibited" is displayed in a row of the main flow to which a row is inserted and there is no dependency, the row is inserted to any one of the previous and next rows. If there is a dependency, a part to which the row is inserted is determined according to the dependency. After this process is performed, the process is shifted to the next row.

The task list of flow0001 finally changes as illustrated in FIG. 11. In FIG. 11, task101 and task102 are inserted between task103 and task002 and the column numbers of task101 and 102 are 0 and 1.

The combining unit 16 copies "flow001" in the workflow DB20 as a new workflow (for example, "flow1001") and the copy reflects the table of flow0001 created in the above loop process. Accordingly, combining the workflows is completed.

FIG. 12 is a schematic diagram illustrating the above-described combination of workflows. Flow0001 includes work tasks task001 to task005 and task003 is an operation for stopping CI500004. Flow003 includes work tasks task101 to task106 and task104 is an operation for stopping CI500004.

In flow1001 obtained by integrating flow001 and flow003, the stop operation on CI500004 is integrated into task0003. While the order of task001 to task002 and the order of task101 to task103 are followed, task001 to task002 and task101 to task103 are executed in parallel. Similarly, while the order of task004 to task005 is followed, task0004 to task005 and task105 are executed in parallel.

Figure 16:
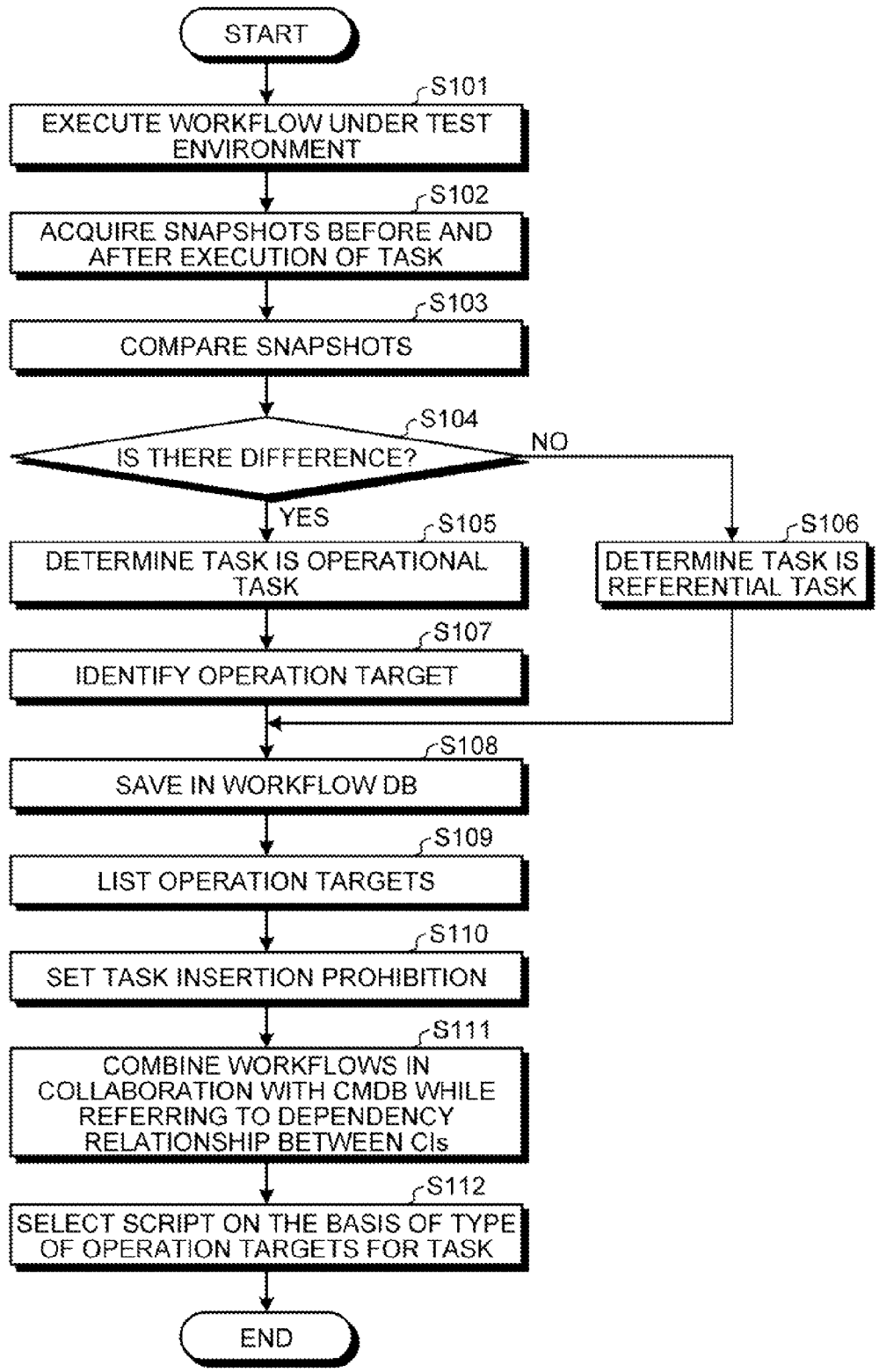
FIG. 16 is a flowchart illustrating processing operations of the workflow DB 20.

FIG. 16 is a flowchart illustrating the process operations of the workflow creating apparatus. First, a workflow is executed under a test environment (step S101) and the acquiring unit 11 acquires snapshots before and after execution of a task (step S102).

The determining unit 12 compares the snapshots (step S103) and determines whether there is a difference between the snapshots (step S104). The determining unit 12 determines that the task with a difference in the snapshots (YES at step S104) is an operational task (step S105) and the identifying unit 13 identifies an operation target (step S107). In contrast, the determining unit 12 determines that a task with no difference in the snapshots (NO at step S104) is a referential task (step S106).

The result of the determination by the determining unit 12 and the result of the identifying by the identifying unit 13 are saved in the workflow DB 20 (step S108). The listing unit 14 then lists operation targets (step S109) and the setting unit 15 may sets prohibition of insertion of tasks (step S110). Thereafter, the combining unit 16 combines, in collaboration with the CMDB 30, the workflows while referring to the dependencies between CIs (step S111). Thereafter, on the basis of the type of the components to which the tasks are performed, a script to be applied is selected as needed (step S112) and the process ends.

Figure 17:
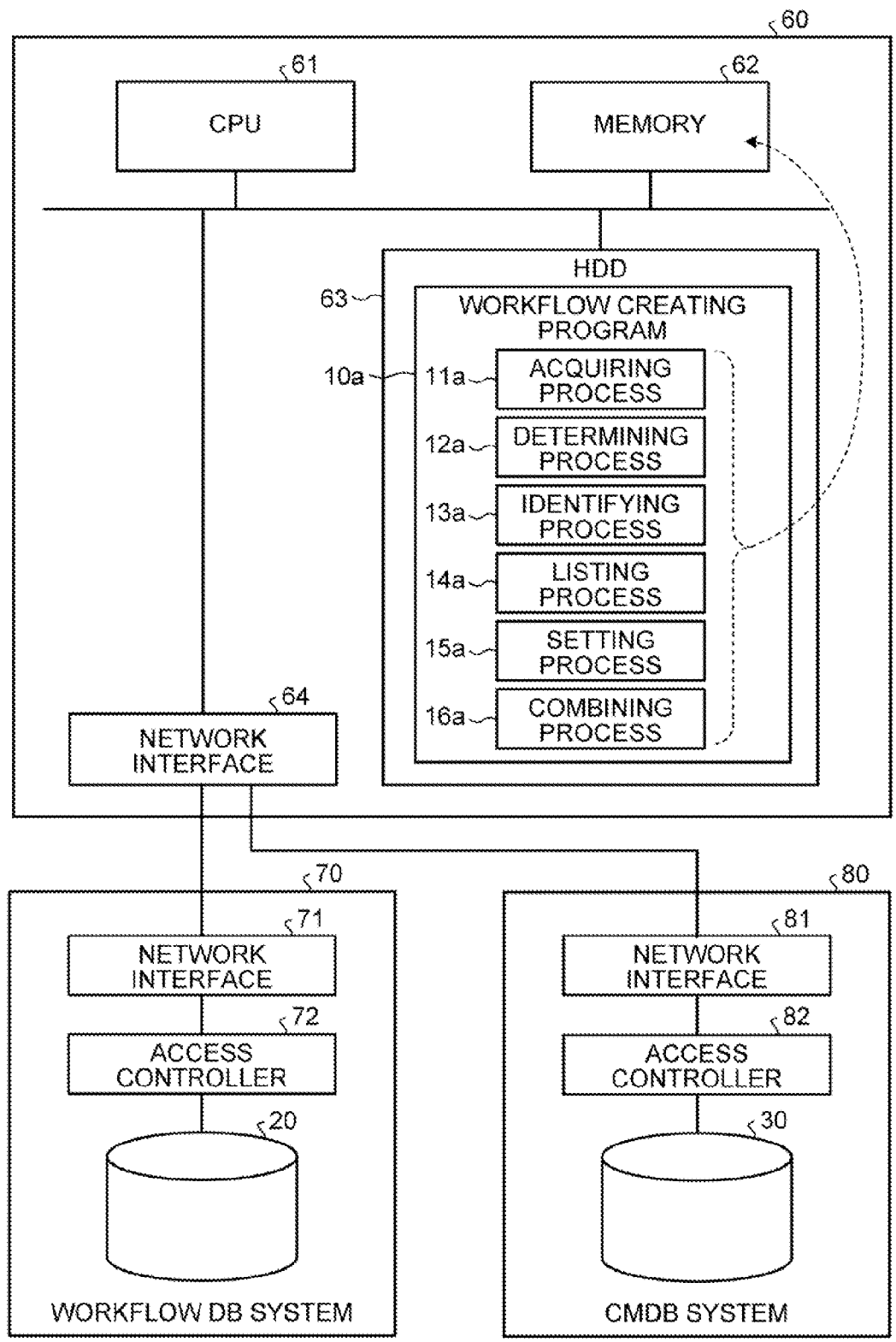
FIG. 17 is a diagram of a configuration of a computer that is caused to run as a workflow creating apparatus.

FIG. 17 is a diagram of a configuration of a computer that is caused to run as a workflow creating apparatus. As depicted in FIG. 17, a computer 60 is configured to include a CPU 61, a memory 62, a hard disk drive (HDD) 63, and a network interface 64 that are connected to a bus. The HDD 63 stores a workflow creating program 10a. The workflow creating program 10a is loaded to the memory 62. The workflow creating program 10a includes an acquiring process 11a, a determining process 12a, an identifying process 13a, a listing process 14a, a setting process 15a, and a combining process 16a that are executed by the CPU 61. The acquiring process 11a performs, when executed by the CPU 61, the function of the acquiring unit 11. The determining process 12a performs, when executed by the CPU 61, the function of the determining unit 12. The identifying process 13a performs, when executed by the CPU 61, the function of the identifying unit 13. The listing process 14a performs, when executed by the CPU 61, the function of the listing unit 14. The setting process 15a performs, when executed by the CPU 61, the function of the setting unit 15. The combining process 16a performs, when executed by the CPU 61, the function of the combining unit 16.

The network interface 64 is connected to a network interface 71 of a workflow DB system 70 and a network interface 81 of a CMDB system 80. The workflow DB system 70 includes, in addition to the network interface 71, an access controller 72 and the workflow DB 20. The access controller 72 accepts an access from the computer 60 via the network interface 71 and processes the access to the workflow DB 20.

The CMDB system 80 includes, in addition to the network interface 81, an access controller 82 and the CMDB 30. The access controller 82 accepts an access from the computer 60 via the network interface 81 and processes the access to the CMDB 30.

As described above, the workflow creating apparatus 10 according to the embodiment determines an operational task from the state before and after execution of a task of a workflow executed under the test environment 40 and then identifies on which component the operation is to be performed. The workflow creating apparatus 10 then extracts a workflow that contains, as an operation target, the component on which the operational task is to be executed, performs a setting process on whether a task may be inserted between a task and the previous task, and combines workflows to obtain a workflow under the real environment 50. The workflows are combined on the basis of the configuration information on the real environment 50, the pervious and next tasks with respect to the operational task, and the dependencies between operation targets for operational tasks.

Thus, the workflow creating apparatus 10 may create a workflow suitable for a different system in which the workflow is loaded. Furthermore, the workflow becomes a workflow that has no effect on another component(s) when the workflow is executed in the system to which the workflow is loaded.

The definition of the workflow tested under the test environment may be automatically applied to the real environment without intentionally correcting the difference between the test environment and the real environment, and thus a workflow for the real environment may be obtained in a short period of time without reducing the workflow quality.

Furthermore, because it is not necessary to prepare, as a test environment, an environment of the same configuration as that of the real environment, the costs for preparing a test environment may be significantly reduced. In addition, because it is not required to determine an environment in consideration of the environmental difference and to define the work procedure under each environment as workflows, the workflow may be simplified and the workflow maintenance costs and a risk in correction may be reduced.

In addition, because the operation target objects (servers and middleware) are associated with the operations that are performed in each workflow, the range on which the workflow has effects and the effects caused when a change occurs in the operation target objects may be seen observed by operating staff, which improves the operational quality.

A workflow suitable for a different system in which a workflow is installed may be created.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A computer-readable, non-transitory medium storing a program that causes a computer to execute a procedure, the procedure comprising:

acquiring a state of each of a plurality of components in a first server device group before and after execution of a task contained in a first workflow that is executed by the first server device group, the components being hardware or software and whose dependencies are previously defined;

determining that the task is an operational task, when the acquired state before and after the execution of the task is changed;

extracting, from a table storing dependency between a plurality of components in the first server device group and a second server device group, a plurality of components in the second server device group having same relationship as operation target components of the operation task; and combining the first workflow and a second workflow containing a task for the extracted components to generate a new workflow.

2. The computer-readable, non-transitory medium according to claim 1, wherein the combining includes determining whether insertion of a task between two consecutive tasks of the first workflow is prohibited, and inserting the task contained in the second workflow between the two consecutive tasks when the insertion is not prohibited.

3. A workflow generating method comprising:

acquiring a state of each of a plurality of components in a first server device group before and after execution of a task contained in a first workflow that is executed by the first server device group, the components being hardware or software and whose dependencies are previously defined;

determining that the task is an operational task, when the acquired state before and after the execution of the task is changed;

extracting, from a table storing dependency between a plurality of components in the first server device group and a second server device group, a plurality of components in the second server device group having same relationship as operation target components of the operation task; and combining the first workflow and a second workflow containing a task for the extracted components to generate a new workflow.

4. A workflow generating apparatus comprising:

a memory; and a processor coupled to the memory, wherein the processor executes a process including:

acquiring a state of each of a plurality of components in a first server device group before and after execution of a task contained in a first workflow that is executed by the first server device group, the components being hardware or software and whose dependencies are previously defined;

determining that the task is an operational task, when the acquired state before and after the execution of the task is changed;

extracting, from a table storing dependency between a plurality of components in the first server device group and a second server device group, a Plurality of components in the second server device group having same relationship as operation target components of the operation task; and combining the first workflow and a second workflow containing a task for the extracted components to generate a new workflow.

* * * * *